United States Patent
Ponting et al.

(10) Patent No.: US 9,456,075 B2
(45) Date of Patent: Sep. 27, 2016

(54) CODEC SEQUENCE DETECTION

(71) Applicant: Avaya Inc., Santa Clara, CA (US)

(72) Inventors: Keith Ponting, Malvern (GB); David Skiba, Golden, CO (US); Valentine C. Matula, Granville, OH (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/512,622

(22) Filed: Oct. 13, 2014

(65) Prior Publication Data

US 2016/0105543 A1 Apr. 14, 2016

(51) Int. Cl.
*G10L 15/00* (2013.01)
*G10L 15/06* (2013.01)
*G10L 19/12* (2013.01)
*G10L 21/00* (2013.01)
*H04M 3/22* (2006.01)
*H04M 3/51* (2006.01)
*H04M 3/36* (2006.01)

(52) U.S. Cl.
CPC ......... *H04M 3/2227* (2013.01); *H04M 3/2209* (2013.01); *H04M 3/36* (2013.01); *H04M 3/5175* (2013.01)

(58) Field of Classification Search
CPC ..... H04M 1/247; H04M 1/271; H04L 29/06; H04L 65/4076; H04L 29/06027; H04L 65/1069; H04L 65/1096; H04N 21/23418; H04W 28/18; H04W 76/02; H04W 88/81
USPC .......... 379/1.01, 9, 15.01, 15.05, 16, 17, 22, 379/201.02, 201.12, 202.01, 207.02, 379/220.01, 221.01, 221.05; 370/231, 235, 370/236, 248, 252; 704/221, 223, 226, 233, 704/237, 247, 275
See application file for complete search history.

(56) References Cited

U.S. PATENT DOCUMENTS

| | | | | |
|---|---|---|---|---|
| 4,827,255 A * | 5/1989 | Ishii | ........................ | G09G 5/028 345/692 |
| 5,058,158 A * | 10/1991 | Matias | .................. | H04N 7/1696 348/E7.059 |
| 5,822,465 A * | 10/1998 | Normile | .................. | G06T 9/008 375/E7.13 |
| 6,057,882 A * | 5/2000 | van den Branden Lambrecht | ........... | H04N 17/004 348/181 |
| 6,223,161 B1 * | 4/2001 | Schliwa | ................ | H04M 1/247 704/247 |
| 6,226,768 B1 * | 5/2001 | Chujo | .................... | H03M 13/33 714/746 |
| 6,584,077 B1 * | 6/2003 | Polomski | .................. | H04N 7/15 348/14.09 |
| 7,245,608 B2 | 7/2007 | Tseng et al. | | |
| 8,374,587 B2 * | 2/2013 | Kampmann | .......... | H04W 28/18 370/326 |
| 8,595,018 B2 * | 11/2013 | Kampmann | ........ | H04W 88/181 342/51 |
| 2004/0045030 A1 * | 3/2004 | Reynolds | ................ | H04L 29/06 725/110 |
| 2004/0258016 A1 * | 12/2004 | Schmidt | .............. | H04M 1/2535 370/329 |

(Continued)

*Primary Examiner* — Binh Tieu
(74) *Attorney, Agent, or Firm* — Sheridan Ross P.C.

(57) ABSTRACT

In order to detect a specific codec sequence being used, a signal that is based on a codec sequence is analyzed. The signal is analyzed to determine if there is a pattern in the signal. A pattern of a codec sequence can be a unique pattern of frames, frequencies and/or frequency ranges that are generated based on a specific codec sequence. The pattern is compared to one or more previously stored patterns of codec sequences to see if there is a match. If there is a match, an event is generated. For example, if a known codec sequence that has a poor signal quality is determined to be in use for a voice call, the parties may be notified that the call is likely to be a low quality voice call.

20 Claims, 5 Drawing Sheets

(56) References Cited

U.S. PATENT DOCUMENTS

| | | | |
|---|---|---|---|
| 2004/0264482 A1* | 12/2004 | Kang | H04L 26/06027 370/401 |
| 2008/0151921 A1* | 6/2008 | Gentle | H04L 47/10 370/412 |
| 2009/0047936 A1* | 2/2009 | Kampmann | H04W 28/18 455/414.1 |
| 2010/0070286 A1* | 3/2010 | Kampmann | H04W 88/181 704/500 |
| 2010/0182930 A1* | 7/2010 | Gentle | H04L 47/10 370/252 |
| 2013/0214943 A1* | 8/2013 | Yen | G10L 19/00 341/50 |
| 2014/0126443 A1* | 5/2014 | Chizgi | H04W 52/02 370/311 |
| 2014/0142959 A1* | 5/2014 | Chubarev | G10L 19/0204 704/500 |
| 2014/0233642 A1* | 8/2014 | Lin | H04N 19/00763 375/240.12 |
| 2014/0314155 A1* | 10/2014 | Neff | H04N 19/85 375/240.26 |
| 2015/0304677 A1* | 10/2015 | Sekiguchi | H04N 19/186 375/240.16 |

* cited by examiner

CODEC SEQUENCE DETECTION

TECHNICAL FIELD

The systems and methods disclosed herein relate to codecs and in particular to detection of the use of codecs.

BACKGROUND

As callers make voice and video calls, the number of networks that the voice and video calls traverse may span multiple networks or devices that use different codecs. The spanning of multiple networks utilizing different codecs may be due to different networks using different protocols and/or the different networks being managed by different enterprises. For example, a voice call may originate in an enterprise using a first codec and then be sent to the Public Switched Telephone Network (PSTN) where the voice call re-encoded using a different codec before the call is completed. In addition, when a user make a voice or video call to another user, the route that voice or video call makes may vary based on various factors, such as congestion, hardware failures, Quality of Service (QoS) parameters, service level agreements, and/or the like.

Sometimes when a voice or video call takes a different route, a different set of codecs are used. Each time a different codec is used for the voice or video call, distortion is inherently introduced into the audio and/or video signal. Depending upon the sequence of codecs that are used for a voice or video call, the quality of the voice or video call may be degraded to a point of where the quality of the voice or video call is unacceptable.

For conference calls with users at various remote locations, the number of different codecs used in the communication path is higher due to the fact that there are a variety of different callers from different locations. Each person on the call may be using different codecs on different networks and devices. When some callers call into the conference call, the codec sequence for the caller's particular communication path may have a high level of distortion when used in combination with other callers on the conference call. To solve this problem, the caller may call in again hoping that a different communication path will be used to get a better call quality.

SUMMARY

Systems and methods are provided to solve these and other problems and disadvantages of the prior art. In order to detect a specific codec sequence being used, a signal that is based on a codec sequence is analyzed. The signal is analyzed to identify if there is an expected pattern in the signal. A pattern of a codec sequence can be a unique pattern of frames, frequencies and/or frequency ranges that are generated based on a specific codec sequence. The pattern is compared to one or more previously stored patterns of codec sequences to see if there is a match or substantial similarity (e.g., a similarity within an acceptable probabilistic amount). If there is a match, an event is generated. For example, if a known codec sequence that has a poor signal quality is identified to be in use for a voice call, the parties may be notified that the call is likely to be a low quality voice call.

DETAILED DESCRIPTION

Figure 1:
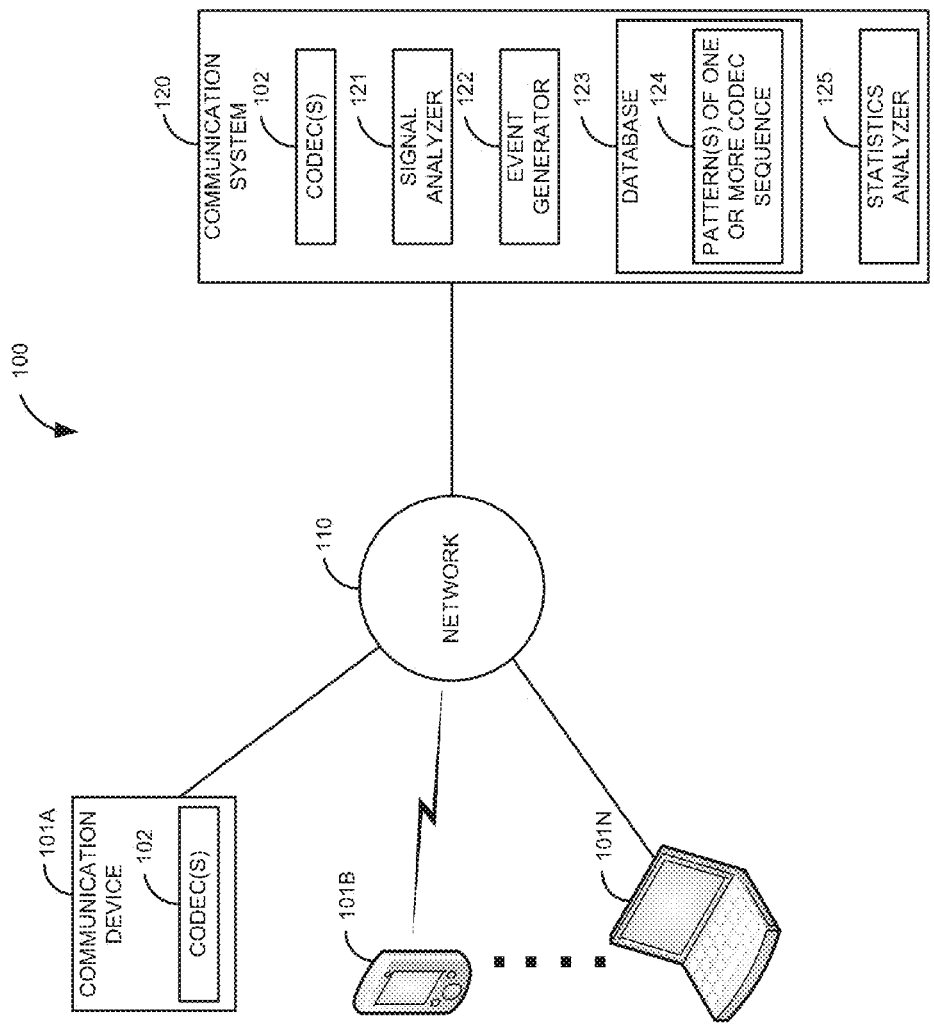
FIG. 1 is a block diagram of a first illustrative system for determining a codec sequence.

FIG. 1 is a block diagram of a first illustrative system 100 for determining a codec sequence. The first illustrative system 100 comprises communication devices 101A-101N, a network 110, and a communication system 120.

The communication device 101 can be or may include be any device that can communicate on the network 110, such as a Personal Computer (PC), a telephone, a video system, a cellular telephone, a Personal Digital Assistant (PDA), a tablet device, a notebook device, a smart phone, a video server, a conference bridge, an audio server, a video bridge, and/or the like. As shown in FIG. 1, any number of communication devices 101A-101N may be connected to the network 110. In addition, the communication device 101 may be directly connected to the communication system 120.

The communication device 101 further comprises one or more codecs 102. A codec 102 is an encoder/decoder for a voice and/or video signal. For example, the one or more codecs 102 may support various voice protocols, such as, G.711, G.729, G.729A, G.723.1, G.726, G.728, G.722, variable rate codecs (e.g. Enhanced Variable Rate CODEC (EVRC)), and/or the like. The one or more codecs 102 may support video protocols, such as H.262, H.263, H.264, H.265, and/or the like. Although communication devices 101B-101N are not shown with a codec 102, the communication devices 101B-101N will also include one or more codecs 102.

The network 110 can be or may include any collection of communication equipment that can send and receive electronic information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), H.323, video protocols, and/or the like.

The communication system 120 can be or may include any collection of communication equipment that can provide communication services for the communication devices 101A-101N, such as a communication manager, a Private Branch Exchange, a central office switch, a proxy server, a gateway, a router, a conference bridge, a video bridge, and/or the like. The communication system 120 further comprises one or more codecs 102, a signal analyzer 121, an event generator 122, a database 123, and a statistics analyzer 125.

The signal analyzer 121 can be or may include any hardware/software that can analyze an audio or video signal 121, such as a digital signal processor, a digital signal processing software application, and/or the like. The signal analyzer 121 can analyze an audio or a video signal. The signal analyzer 121 can analyze an analog or digital signal.

The event generator 122 can be any hardware/software that can generate an event based on patterns in a signal, such as, a digital signal processor, a software application, and/or the like. The event generator 122 can generate various events based on user or system defined conditions.

The database 123 can be any type of database 123, such as a relational database, a directory service, a file system, a file, and/or the like. The database 123 further comprises one or more patterns of codec sequences 124. A pattern of a codec sequence 124 is a pattern that can be detected from an audio or video signal based on a particular sequence of codecs 102 that are used to encode the audio or video signal. The database 123 can be any form of hardware used to store electronic information. In some embodiments, the database 123 may correspond to a relational database. Furthermore, the database 123 does not necessarily have to reside within the communication system 120, but can be made accessible to the communication system 120 via a network 110.

The statistics analyzer 125 can be any hardware/software that analyzes statistics, such as, a software application, an application specific processor, and/or the like. The statistics analyzer 125 can be used to analyze a variety of data related statistics produced from the signal, such as to identify trends of different voice and/or video signals.

Although the first illustrative system 100 shows the elements 102 and 121-125 as being part of the communication system 120, in other embodiments, the elements 102 and 121-125 may be located in other devices. For example, the elements 121-125 may be located in the communication device 101.

Alternatively, the elements 102 and 121-125 may be located in a network analyzer within the network 110. In other embodiments, the elements 102 and 121-125 may be distributed between the communication system 120 and other elements within the network 110. For example, the database 123 may be located on a server connected to the network 110.

In still another embodiment, the elements 102 and 121-125 may be distributed between the communication device 101 and the communication system 120. For example, signal analyzer 121 may be located in the communication device 101 and the event generator 122 may be located in the communication system. Alternatively, portions of the elements 121-125 may be distributed between the communication device 101 and the communication system 120.

Figure 2:
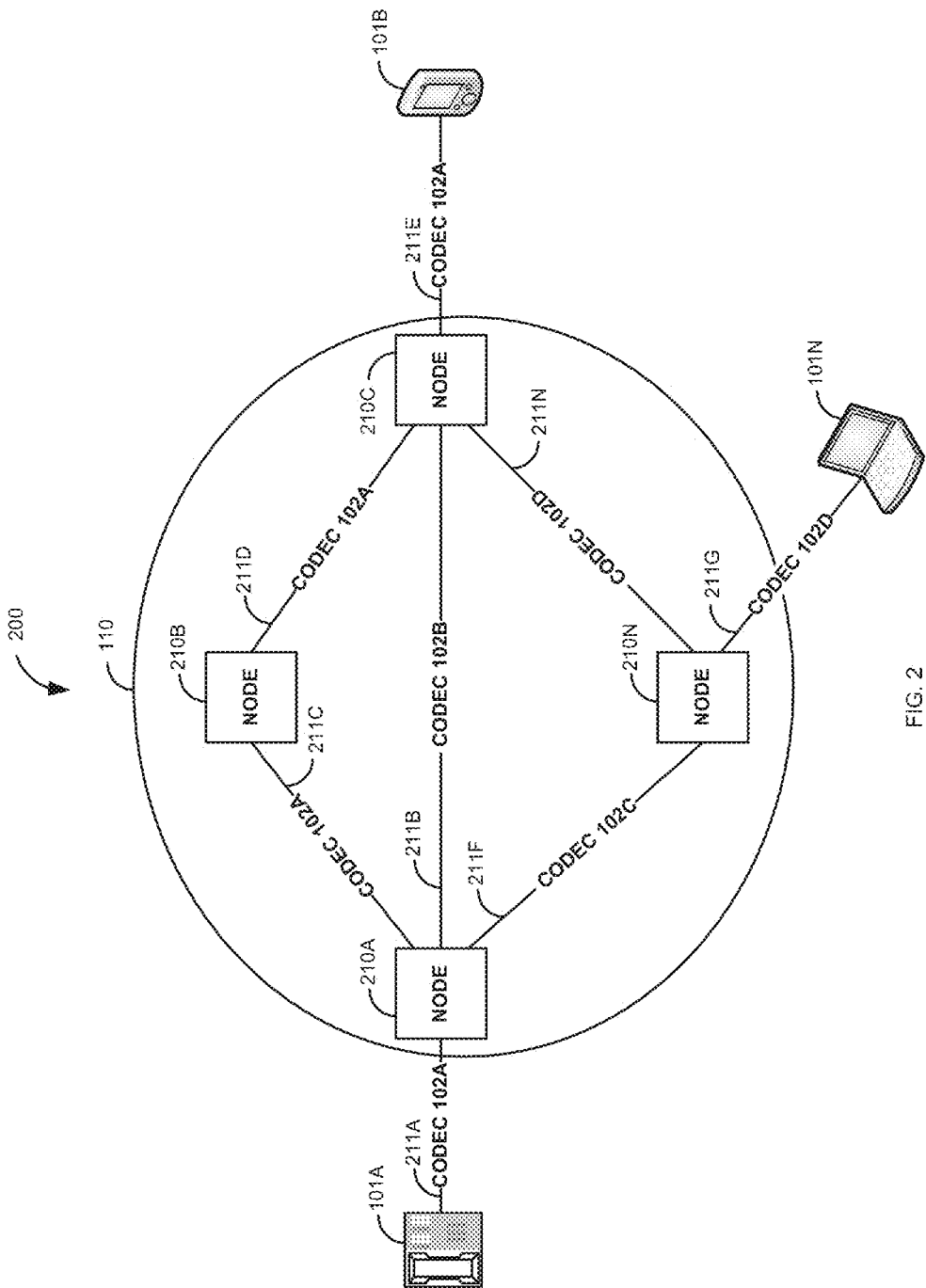
FIG. 2 is a block diagram of a second illustrative system for determining a codec sequence.

FIG. 2 is a block diagram of a second illustrative system 200 for determining a codec sequence. The second illustrative system 200 comprises the communication devices 101A-101N and the network 110.

The network 110, in this embodiment, comprises nodes 210A-210N and links 211A-211N. The use of the designator N indicates that there may be any number of nodes 210 and/or links 211. The nodes 210A-210N are switching/routing elements in the network 110. One or more of the nodes 210A-210N may comprise the communication system 120. The links 211A-211N can be any types of communication links that interconnect the nodes 210A-210N and/or the communication devices 101A-101N, such as a wire link, a wireless link, a fiber optic link, a communication network, and/or the like.

The links 211A-211N that interconnect the nodes 210A-210N and each of the communication devices 101A-101N show a specific type of codec 102 being used for the link 211. The links 211A, 211C-211E each use the codec 102A. The link 211B uses the codec 102B. The link 211F uses the codec 102C and the links 211G-211N use the codec 102D. Although the links 211A-211N are only shown to support a single codec 102, actual implementations of a link 211 may support multiple codecs 102.

The network 110, in this embodiment, represents a packet switched network for illustrative purposes. However, in some embodiments, some or all of the nodes 210/links 211 may use circuit switching technologies/codecs 102. In the network 110, a voice or video call may be established using various routes. Table 1 shows each of the possible routes that can be used for voice or video calls made between the communication devices 101A-101N.

TABLE 1

| COM. DEVICE | CODEC SEQUENCE | COM. DEVICE | ROUTE | QUALITY |
|---|---|---|---|---|
| 101A | A | 101B | 210A-210B-210C | HIGH |
|  | A-B-A |  | 210A-210C | MEDIUM |
|  | A-C-D-A |  | 210A-210N-210C | LOW |
| 101A | A-C-D | 101N | 210A-210N | LOW |
|  | A-D |  | 210A-210B-210C-210N | MEDIUM |
| 101B | A-D | 101N | 210C-210N | MEDIUM |
|  | A-C-D |  | 210C-210B-210A-210N | LOW |

Table 1 is shown based on an audio or video signal originating from the communication device 101 on the left hand side of table 1. However, for an interactive voice or video call, an audio and/or video signal will also be sent in the opposite direction. There are three possible routes for a call between the communication devices 101A and 101B. The first route is between the nodes 210A-210B-210C. This route only uses the codec 102A. Since only a single type of codec 102A is used, the codec sequence is codec 102A to codec 102A (A). This route has a high quality because it only uses one codec 102A. However, in one embodiment, the signal may be lower quality because it is encoded/re-encoded using the same code. Although not shown in Table 1, this type of codec sequence would be shown as A-A, A-A-A, etc. The second route is between nodes 210A and 210C. This route uses two different codecs (the codec 102A and the codec 102B). Thus, the codec sequence is A-B-A. This route has a medium quality. The third route is between nodes 210A, 210N, and 210C. This route uses three different codecs (the codec 102A, the codec 102C, and the codec 102D). Thus, the codec sequence is A-C-D-A. This route has a low quality. The routes/codec sequences/quality are also shown for the possible routes between the communication devices 101A and 101N and routes between the communication devices 101B and 101N in a similar manner.

The codec sequence for a specific direction of a call may be different than the other direction. For example, for a voice call between the communication device 101A and the communication device 101B, the codec sequence for the audio signal from the communication device 101A to the communication device 101B may be A and the codec sequence for the audio signal from the communication device 101B to the communication device 101A may be A-B-A.

For a video conference call between the communication devices 101A-101N (for a peer to peer conference call or assuming one of the nodes 210 is a video bridge), the video conference call will comprise multiple codec sequences/routes for the various legs of the video conference call. In addition, there may be a completely different set of codecs 102/codec sequences for the audio portion of the conference call versus the video portion of the conference call.

Figure 3:
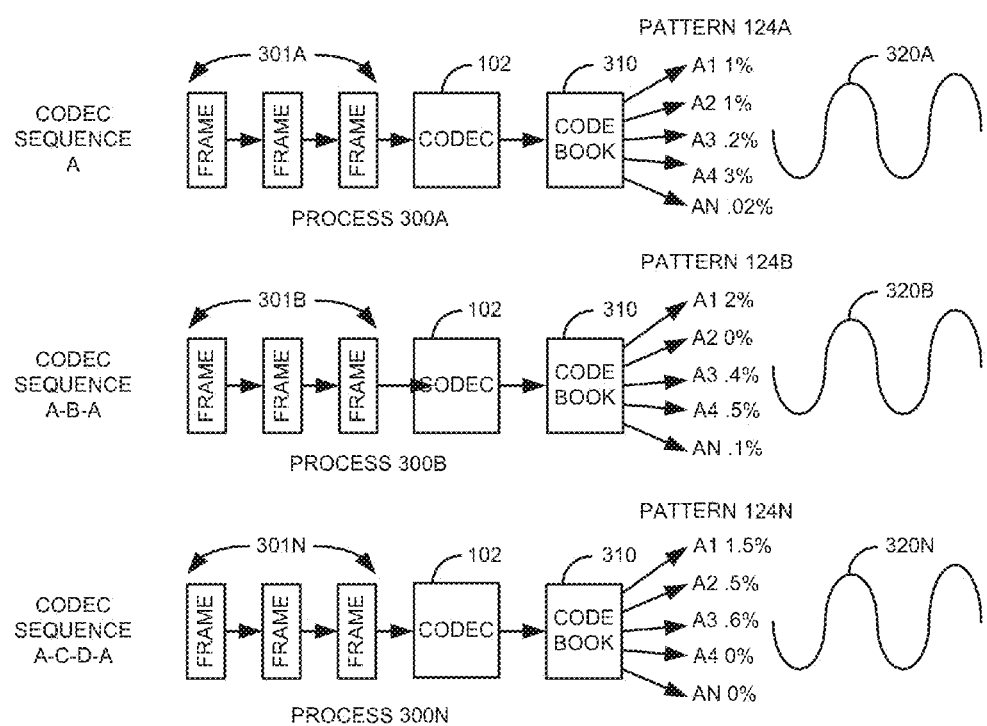
FIG. 3 is a diagram to illustrate how patterns of codec sequences are determined.

FIG. 3 is a diagram to illustrate how patterns of codec sequences 124A-124N are identified. FIG. 3 comprises processes 300A-300N, frames 301A-301N, codec 102, codebook 310, patterns of codec sequences 124A-124N and analog signals 320A-320N.

The processes 300A-300N represents a process of how frames 301 of a codec 102 are converted used to produce the patterns of codec sequences 124A-124N.

The frames 301A-301N are groupings of information that represent one or more samples of an analog signal that are generated by a sequence of codecs. As a first codec 102 (not shown) samples the analog signal, the analog signal is converted into the digital frames 301A-301N that represent the analog signal. The frames 310A-310N are encoded using the codebook 310. A codebook 310 is specific to a particular codec 102. For example, a codebook 310 for a G.711 codec 102 will be different than a codebook 310 for a G.729 codec 102.

The frames 310A-301N may then be converted to a different codec protocol by a second codec 102/codebook 310. The frames 310A-310N are then received by the receiving codec 102 which uses the necessary codebook 310 to decode the frames 301A-301N to reproduce a digital signal that can be converted to an analog signal 320 (e.g., a voice or video signal). The receiving codec 102 uses the same codebook 310 (if the codec 102 is the same type of codec 102) to lookup a number encoded in the frame 301 to reproduce the same frequency of the one or more samples. Thus, the analog signal 320 is regenerated by the receiving codec 102.

As illustrated by process 300A, frames 301A of a voice signal using the codec sequence A (as described previously in Table 1) are decoded by the codec 102. The codec 102 uses the codebook 310 to lookup one or more attributes for the regenerated audio signal (i.e., A1-AN) associated with the number in each of the frames 301A. For example, the G.729 codec uses an 80-bit frame for every 10 milliseconds of audio. 18 of those 80 bits encode a linear predictive analysis which when decoded generates a power spectrum shape attribute for the regenerated signal. At this level of detail there would be N=262144 (2 to the power 18) distinct values of the spectrum shape attribute, but:

(i) those 18 bits encode a residual from a moving average of the true spectrum shape, so the set of possible generated spectrum shapes may be larger;

(ii) for the purposes of codec sequence analysis the set of possible distinct values could be reduced by, for example, using even coarser quantization of the generated spectrum shape parameters.

(iii) Similar comments apply for other receiving codecs 102 based on linear predictive analysis. Where the receiving codec 102 is one (for example G.711) which does not incorporate a linear predictive analysis, further analysis (for example, linear predictive analysis) of the regenerated audio signal may be used in order to determine suitable attribute values.

As this process is repeated over time for each frame 301, a pattern emerges based on the codec sequence A. The pattern for the codec sequence A shows a 1% occurrence of frames 301 that produce the attribute 1, a 1% occurrence of frames 301 that produce the attribute 2, a 0.2% occurrence the frames 301 that produce the attribute 3, a 3% occurrence of frames 301 that produce the attribute 4, and a 0.02% occurrence of frames 301 that produce the attribute N. The pattern of the codec sequence A (124A) can then be matched with a pattern produced by a voice signal to determine if the voice signal uses the codec sequence A. The percentages shown in FIG. 3 are likely lower than what is shown. However, the larger numbers are used to better illustrate the point.

Likewise, the process 300B works in a similar manner for a different codec sequence A-B-A. The frames 301 of the voice signal using the codec sequence A-B-A are decoded by the codec 102 using the codebook 310 to produce the pattern of the codec sequence 124B. Similarly, the process 300N generates the pattern of the codec sequence 300N for the codec sequence A-C-D-A. When a voice signal is decoded by the codec 102, the generated pattern of the codec sequence 124 can be matched to a previously generated pattern of the codec sequence 124 to determine which codec sequence is being used (or likely being used) for a particular voice signal.

For example, assume that the database 123 contains the patterns of the codec sequences 124A-124N. When a voice signal is received, the frames 301 of the incoming voice signal are analyzed by the signal analyzer 121 to determine a pattern in the voice signal. The pattern is matched (compared) by the event generator 122 to one of the patterns of the codec sequences 124A-124N. If there is a determined match, an event is generated by the event generator 122. For example, the event can be to store the matched codec sequence in the database 123.

This process can be used to determine codecs 102 with different frequency ranges. For example, if a receiving codec 102 has a frequency range of 300 Hz to 8,000 kHz and the received frames only have a frequency range of 300 Hz to 3,400 kHz, the process can determine that a codec with a different frequency range was in the codec sequence. This is illustrated by process 300N where F4-FN show a 0% pattern in the attributes corresponding to non-zero energy at higher frequency ranges.

The above process can also work for video codec sequences. Similar patterns can be detected in sequences of video codecs. For a video codec 102, patterns of pixels in a digital video frame 301 (e.g., video frames 301) can indicate patterns. For example, a video stream encoded using a particular video codec sequence may have certain pixels with specific colors verses other codec sequences that do not have the specific colors, do not have certain pixels, and/or have different percentages of the pixels.

In one embodiment, the patterns of the codec sequences 124A-124N are generated based on a specific language being spoken in a voice signal. For example, each of the patterns of the codec sequences 124A-124N are generated based on the English language. The English patterns of the codec sequences 124A-124N are then matched to a pattern in an English voice signal.

In another embodiment, the patterns of the codec sequences 124 may be for a specific part of the signal. For example, the patterns of the codec sequence 124 may be determined based on a determining a common pattern of background noise for silence periods in the signal. For example, if a known codec 102 or manufacturer of a codec uses the same pattern of background noise for silence in an audio signal, the codec 102 can be identified as being in the codec sequence.

The above examples can also be based on a variable rate codec 102. For example, an enhanced variable rate codec 102 uses an $\frac{1}{8}^{th}$ bit rate for silence periods in a voice communication. In addition to detecting silence periods, variable rate codecs 102 can be detected in the same manner as regular rate codecs 102 using patterns of codec sequences 124.

In another embodiment, the process can detect the same codecs being used in a different order. For example, the process can detect a pattern for the codec sequence A-C-D-A and detect a different pattern for the codec sequence A-D-C-A or A-D-A-C.

Figure 4:
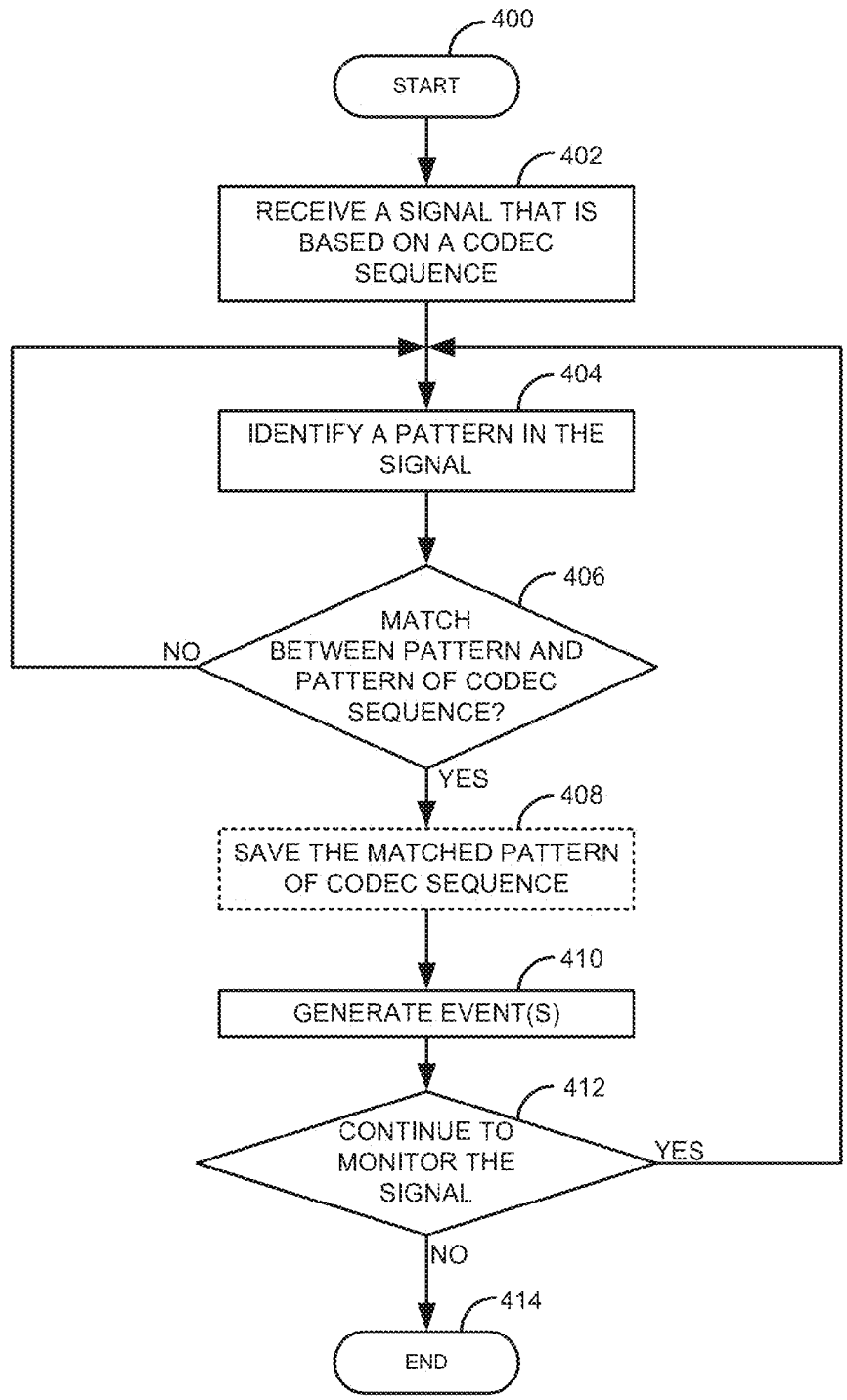
FIG. 4 is a flow diagram of a process for determining a codec sequence.
Figure 5:
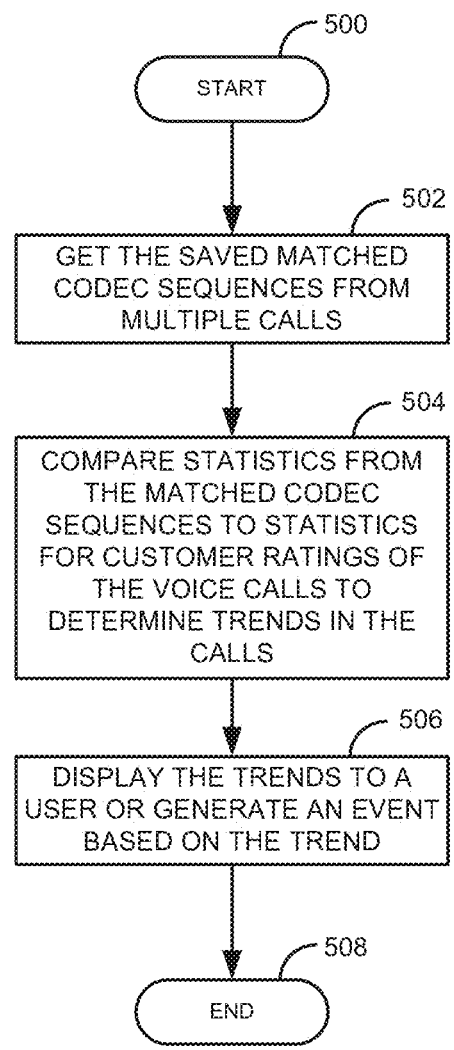
FIG. 5 is a flow diagram of a process for matching codec sequences to customer ratings of calls.

FIG. 4 is a flow diagram of a process for determining a codec sequence. Illustratively, the communication devices 101A-101N, the codecs 102, the communication system 120, the signal analyzer 121, the event generator 122, the database 123, and the statistics analyzer 125 are stored-program-controlled entities, such as a computer or processor, which performs the method of FIGS. 4-5 and the processes described herein by executing program instructions stored in a tangible computer readable storage medium, such as a memory or disk. Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

The process starts in step 400. The signal analyzer 121 receives a signal that is based on a codec sequence in step 402. The signal can be an audio or video signal. The signal can be a digital signal or an analog signal. For example, the signal can be frames 301 that have been generated by an audio or video codec 102 that are received in step 402. Alternatively, the signal can be an analog signal that was generated from a signal encoded by a codec 102.

The signal analyzer 121 identifies a pattern in the signal in step 404. The signal analyzer 121 can identify a pattern in the signal in various ways. As discussed above in FIG. 3, the signal analyzer 121 can identify a pattern in the signal based on a pattern produced by a codebook 310.

The event generator 122 determines if there is a match between the pattern and one of the patterns of the codec sequences 124 in step 406. The event generator 122 can determine if there is a match in various ways. For example, as described in FIG. 3, the event generator 122 can determine a match based on a codebook 310 pattern.

Alternatively, the event generator 122 can determine if there is a match based on a frequency range (a pattern) of an analog signal being different from the frequency range of the codec 102 in the communication device 101 receiving the signal. For example, assume that the audio frequency range of the sending codec 102 in the communication device 101 is 300 Hz to 8,000 kHz. However, the received analog audio signal only has a range of 300 Hz to 3,400 kHz. If the sending codecs 102 all have a frequency range of 300 Hz to 8,000 kHz, the received signal would also have a similar frequency range. Because of the lower frequency range of the analog signal, the signal analyzer 121 can determine that a codec 102 with a frequency range of 300 Hz to 3,400 kHz was involved as a part of the codec sequence.

In one embodiment, the exact codec 102 can be derived based on a lookup table that indicates codecs 102 used by devices on the communication path. The frequency analyzer 121 can look to see which codec 102 may be in the communication path that has a frequency range of 300 Hz to 3,400 kHz. There may be different lookup tables based on a specific service provider providing the call. The signal analyzer 121 may also know the codec 102 of the sending communication device 101. Thus, the signal analyzer 121 may be able to determine the codec sequence or a likely codec sequence.

If there is not a match in step 406, the process goes back to step 404. Otherwise, if there is a match in step 406, the event generator 122 can optionally save the matched pattern of the codec sequence 124 to the database 123 in step 408.

The event generator 122 generates one or more event(s) in step 410. The event(s) that are generated in step 410 can vary based on implementation and/or user preferences. For example, the event can be to alert a call center agent of a difficult codec sequence that may cause a poor quality voice or video call. This way, the call center agent may try and reestablish the call with a customer.

The event can be to notify a call center agent to switch from a speakerphone to a handset. Some codecs sequences may provide poor signal quality if the audio signal encoded by the codec 102 is from a speaker phone. By notifying the call center agent, a higher quality call will result.

In one embodiment, a rating of the call center agent can be adjusted. This way the agent is not penalized for trying to deal with a poor quality call. In another embodiment, the call can be routed to a different call center agent who is better at handling poor quality calls.

In one embodiment, the process can switch the call to a different medium. For example, the process could switch a voice call to an Instant Messaging call. In another embodiment, the process could notify a customer that the signal may not be a high quality signal based on the particular codec sequence.

Alternatively, the call could be rerouted to use a different codec sequence. For example, the event generator 122 could send a message to a router in the communication path to send the call to a different router or use a different codec 102.

For a conference call, the event generator 122 could switch a leg of the conference call to a different mixer of the conference call. In another embodiment, the event generator 122 could notify a service provider of a poor audio signal in the call and/or notify the service provider of a variance to a Quality of Service (QoS) contract.

In one embodiment, if the signal analyzer 121 is located in the communication device, additional bandwidth may be used during a call (or intermittently during a call) to transmit results of the pattern matching. The results can be stored in the database 123 or used by a contact center or other entity.

The process determines in step 412 if the signal analyzer 121 wants to continue monitoring the signal. If the signal analyzer 121 wants to continue monitoring the signal in step 412, the process goes to step 404. This way, the process could detect a change of a codec sequence or a variable rate codec in the call. Otherwise, the process ends in step 414.

FIG. 5 is a flow diagram of a process for matching codec sequences to customer ratings of calls. The process starts in step 500. The process gets, in step 502, the matched patterns of the codec sequences 124 that were saved in step 408 of FIG. 4. The number of matched patterns of the codec sequences 124 can be based on different codec sequences detected from different voice or video calls. For example, the voice or video calls may be voice or video calls that are made to a call center over a time period.

The process compares statistics from the matched codec sequences to statistics for customer rating of corresponding voice or video calls to determine trends in the calls. For example, if the statistics for voice calls with the codec sequence A receives consistently receives high call ratings while the codec sequence A-C-D consistently receives low call rating, the process can determine a trend based on the type of codecs 102 being used for calls into a contact center.

The process displays the trends to a user in step 506. The user can then use the trend information to better manage the system. For example, a manager of a call center can use the trends to better manage calls and agents in the call center. In one embodiment, the process can generate an event based on a trend in step 506. For example, the process can notify an administrator of a negative trend. The process ends in step 508.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving, by a processor, an audio signal that is based on a codec sequence;
   identifying, by the processor, a pattern in the audio signal;
   determining, by the processor, that there is a match between the identified pattern in the audio signal and an expected pattern of a codec sequence, and wherein the expected pattern of the codec sequence is determined based on a common pattern of background noise for silence periods in the audio signal; and
   in response to determining that there is a match between the identified pattern in the audio signal and the expected pattern of the codec sequence, generating, by the processor, an event.

2. The method of claim 1, wherein the audio signal is a digital voice signal or an analog voice signal.

3. The method of claim 1, wherein the event is one of:
   alerting a call center agent of a difficult codec sequence;
   notifying the call center agent to switch from speakerphone to a handset;
   adjusting a rating of the call center agent;
   routing the audio signal to a different call center agent;
   switching a call for the audio signal to a different medium;
   notifying a customer that the audio signal may not be a high quality audio signal;
   re-routing the call for the audio signal;
   switching to a different codec in the codec sequence for the audio signal;
   switching a leg of a conference call to a different mixer of the conference call;
   sending a message to a communication system to switch to a different codec for the call for the audio signal;
   notifying a service provider of a poor audio signal in the call for the audio signal; or
   notifying a service provider of a variance to a Quality of Service (QoS) contract.

4. The method of claim 1, wherein the audio signal comprises a plurality of combined voice calls, wherein the plurality of voice calls use a plurality of different codec sequences, wherein the event is to save statistics based on the plurality of different codec sequences, and further comprising:
   comparing, by the processor, the statistics based the plurality of different codec sequences to statistics for customer ratings of the plurality of voice calls to identify trends in the plurality of voice calls.

5. The method of claim 1, wherein the pattern of the codec sequence comprises a plurality of patterns of codec sequences.

6. The method of claim 5, wherein at least one of the plurality of codec sequences comprises a codec sequence that comprises at least two or more different codecs.

7. The method of claim 1, wherein the pattern of the codec sequence is based on a frequency range of a codec.

8. The method of claim 1, wherein the pattern of the codec sequence is based on a pattern of a codebook of a codec.

9. The method of claim 1, wherein the pattern of the codec sequence is based on a language spoken in the audio signal.

10. A system comprising:
    a microprocessor; and
    a computer readable medium, coupled with the microprocessor and comprising microprocessor readable and executable instructions that program the microprocessor to execute:
    a signal analyzer that receives an audio signal that is based on a codec sequence and identifies a pattern in the audio signal; and
    an event generator that determines that there is a match between the pattern identified in the audio signal and an expected pattern of a codec sequence, wherein the expected pattern of the codec sequence is determined based a common pattern of background noise for silence periods in the audio signal and in response to determining that there is a match between the pattern identified in the audio signal and the expected pattern of the codec sequence, generates an event.

11. The system of claim 10, wherein the event is one of:
    alerting a call center agent of a difficult codec sequence;
    notifying the call center agent to switch from speakerphone to a handset;
    adjusting a rating of the call center agent;
    routing the audio signal to a different call center agent;
    switching a call for the audio signal to a different medium;
    notifying a customer that the audio signal may not be a high quality audio signal;
    re-routing the call for the audio signal;
    switching to a different codec in the codec sequence for the audio signal;
    switching a leg of a conference call to a different mixer of the conference call;
    sending a message to a communication system to switch to a different codec for the call for the audio signal;
    notifying a service provider of a poor audio signal in the call for the audio signal; or
    notifying a service provider of a variance to a Quality of Service (QoS) contract.

12. The system of claim 10, wherein the audio signal comprises a plurality of voice calls, wherein the plurality of voice calls use a plurality of different codec sequences, wherein the event is to save statistics based on the plurality of different codec sequences, and further comprising a statistics analyzer that compares the statistics based the plurality of different codec sequences to statistics for customer ratings of the plurality of voice calls to identify trends in the plurality of voice calls.

13. The system of claim 10, wherein the pattern of the codec sequence comprises a plurality of patterns of codec sequences and wherein at least one of the plurality of codec sequences comprises a codec sequence that comprises at least two or more different codecs.

14. The system of claim 10, wherein the pattern of the codec sequence is based on a frequency range of a codec.

15. The system of claim 10, wherein the pattern of the codec sequence is based on a pattern of a codebook of a codec.

16. A system comprising:

a microprocessor; and a computer readable medium, coupled with the microprocessor and comprising microprocessor readable and executable instructions that program the microprocessor to execute:

a signal analyzer that receives a digital video signal that is based on a codec sequence and identifies a pattern in the digital video signal; and an event generator that determines that there is a match between the pattern identified in the digital video signal and an expected pattern of a codec sequence, wherein the expected pattern of the codec sequence is based on a pixel pattern in the digital video signal and in response to determining that there is a match between the pattern identified in the digital video signal and the expected pattern of the codec sequence, generates an event.

17. The method of system 16, wherein the event is one of:

alerting a call center agent of a difficult codec sequence;

adjusting a rating of the call center agent;

switching a call for the digital video signal to a different medium;

notifying a customer that the digital video signal may not be a high quality video signal;

re-routing the call for the digital video signal;

switching to a different codec in the codec sequence for the digital video signal;

switching a leg of a conference call to a different mixer of the conference call;

sending a message to a communication system to switch to a different codec for the call for the digital video signal; or notifying a service provider of a variance to a Quality of Service (QoS) contract.

18. The method of system 16, wherein the pattern of the codec sequence is based on a pattern of a codebook of a codec.

19. The method of system 16, wherein the pattern of the codec sequence comprises a plurality of patterns of codec sequences.

20. The method of system 19, wherein at least one of the plurality of codec sequences comprises a codec sequence that comprises at least two or more different codecs.

* * * * *